Feb. 22, 1966    N. H. MACKWORTH ETAL    3,236,578
VISUAL CONCENTRATION OBSERVATION SYSTEM
Filed May 13, 1960    2 Sheets-Sheet 2
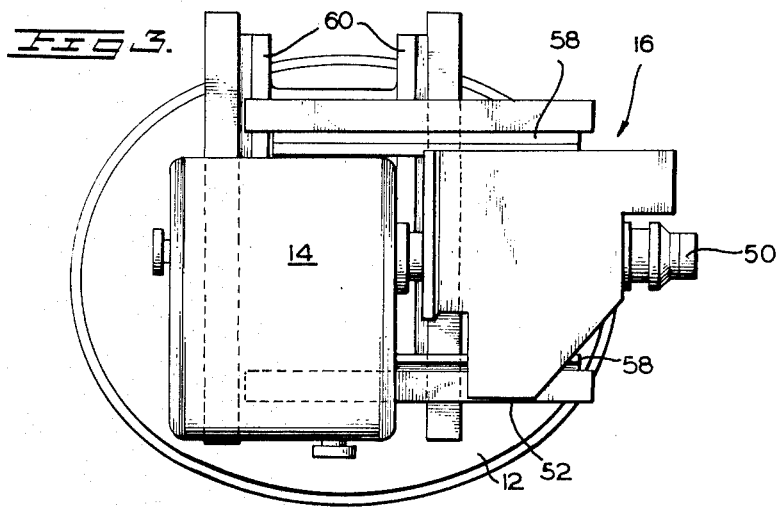
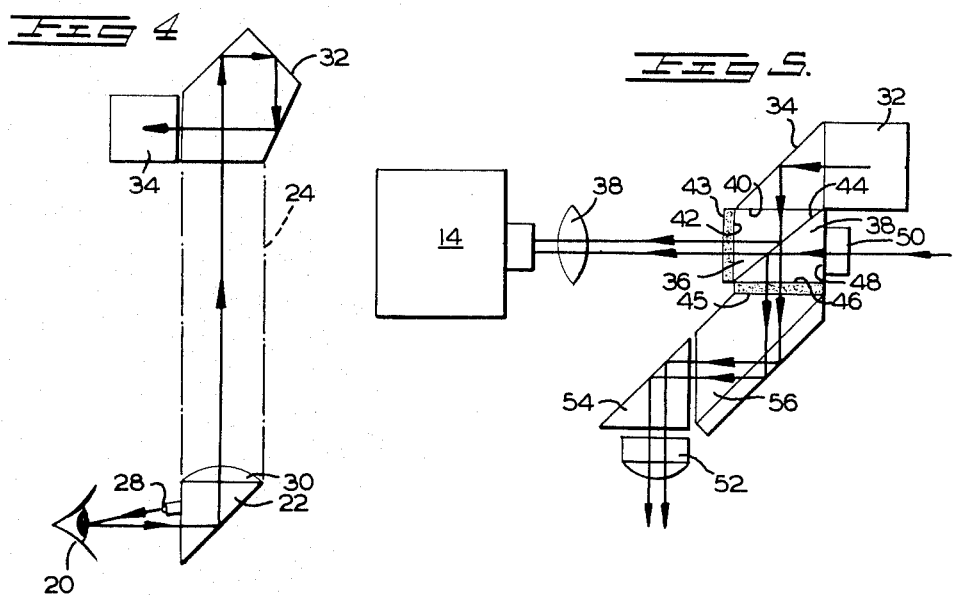
*INVENTOR*
NORMAN HUMPHREY MACKWORTH
EDWARD ROLAND CARRE LLEWELLYN THOMAS
*by their attorney*
*John F. C. Glenn*

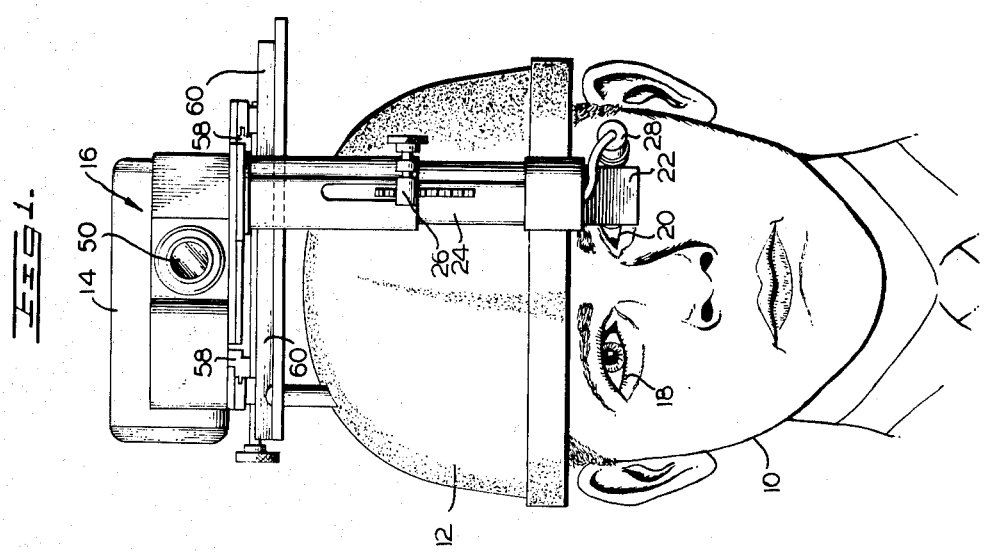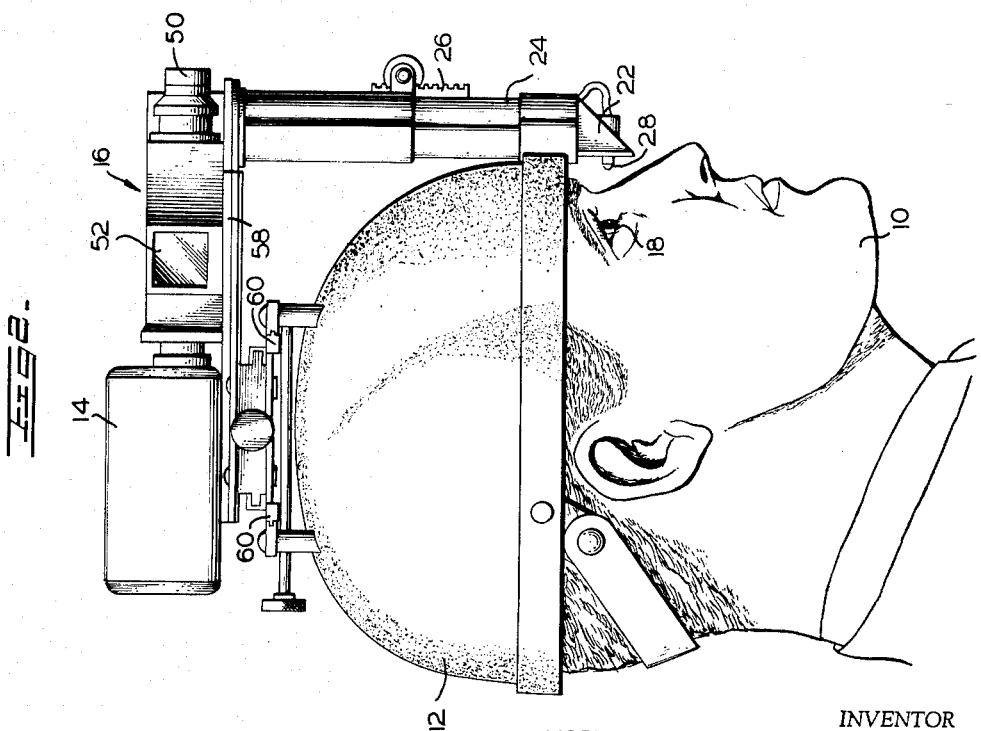

United States Patent Office 3,236,578
Patented Feb. 22, 1966

3,236,578
VISUAL CONCENTRATION OBSERVATION SYSTEM
Norman Humphrey Mackworth, 4 Eggleston Lane, Old Greenwich, Conn., and Edward Roland Carre Llewellyn Thomas, 152 Golfdale Road, Toronto, Ontario, Canada
Filed May 13, 1960, Ser. No. 29,090
2 Claims. (Cl. 351—7)

This invention relates to means and method of determining and recording the shifting point of concentration of a human or other eye as it observes a scene.

A general indication of where a subject is looking can be obtained by attaching to the subject's head a lamp focused to throw a narrow beam of light in the direction of the subject's gaze as he looks straight ahead. This method is inaccurate, however, to the extent that it fails to take into account the movement of the subject's eyes independently of the head. For example, when an airplane pilot looks at an instrument panel, his head may move little or not at all as his eyes focus successively on various dials which he must find and read quickly before shifting his attention elsewhere. In order to arrange the instruments for easiest and quickest reading by the pilot, it is important to have some means of determining exactly what the pilot is looking at as his eyes sweep a particular arrangement of instruments and try to pick out and read certain instruments as quickly as possible. For purposes of testing pilots, it would also be very helpful to have a means of checking what their eyes looked at on a simulated instrument panel when confronted with a simulated emergency. Such means of following the glance of an eye have many other useful applications, among which are checking the physical and psychological condition of the subject, and checking the preferential reactions of persons confronted with a group of objects displayed together, such as rival commercial packages.

The present invention provides such a means of following and marking the glance of an eye as fast as the eye moves, so that an observer can note what the eye of the subject is watching at the time. Moreover, a photographic or television picture can be made of the scene with a spot of light shown at the particular point of concentration of the subject's eye.

For a better understanding of the invention, reference is now made to the present preferred embodiment shown, for purposes of illustration only, in the accompanying drawings.

In the drawings:

FIG. 1 shows a front elevation of the apparatus embodying the invention, mounted on a man's head;

FIG. 2 shows a side elevation of the apparatus shown in FIG. 1 (taken from the left side of FIG. 1);

FIG. 3 shows a top elevation of the apparatus shown in FIGS. 1 and 2;

FIG. 4 shows part of the optical system of the apparatus shown in FIGS. 1–3, starting from the end of the optical system nearest to the subject's eye; and FIG. 5 shows the remainder of the optical system, including the two uppermost elements shown in FIG. 4.

Referring now more particularly to the drawings, and initially to FIGS. 1–3, a subject's head 10 is shown wearing a helmet 12 on which is mounted camera 14 and optical system indicated generally as 16. While the ilustrated camera 14 is a moving picture camera, it could be a still, television or other form of pictorial camera.

One eye 18 of the subject is free to look ahead without obstruction, and the other eye 20 looks into a triangular prism 22 mounted at the lower end of a telescoping tube 24. In the illustrated embodiment, the prism 22 and tube 24 are directly in front of the eye, but the system of the invention can also work effectively when these elements are offset so that the eye 20 can see past them while the prism 22 views the eye 20 obliquely. The length of the tube 24 is adjustable by means of a rack and pinion 26 in order to help position the prism 22 correctly in front of the eye 20. A small electric light unit 28 is mounted next to the prism 22 and shines a narrow beam of light directly into the cornea of the eye 20, which reflects the light back into the prism 22, where it is deflected upwardly through a lens 30 (FIG. 4) and through the tube 24 to a pentaprism 32, where the beam is reflected into a triangular prism 34, and thence into a triangular prism 36 which is mounted next to a like prism 38 to form a rectangular beam-splitting block. The prism 36 has three vertical rectangular faces 40, 42 and 44. The face 40 is clear and is mounted to pass light from prism 34. The face 42 extends at right angles to face 40 and a ground glass screen 43 is mounted on it to show an image which can be photographed by the camera 14 through a supplementary close-up lens 38. The face 44 extends diagonally at an angle of 45° to the other two faces and is half silvered and cemented to the corresponding diagonal face of the prism 38, so that half of the light coming to these diagonal faces from either side of them passes straight through as if they were not there, and the other half is reflected as if by a mirror between said diagonal faces. The prism 38 has a face 46 (with a ground glass screen 45 mounted on it) extending parallel to face 40 of prism 36, and has a clear face 48 parallel to face 42 of prism 36. A lens 50 is mounted next to face 48, and aligned with the lens of camera 14. The lens 50 focuses the scene in front of the subject on the ground glass screens 43 and 45 simultaneously, through the beam splitting action of prisms 36 and 38 (about half of the light from the lens 50 being focused on screen 43, and the other half on screen 45, after deducting light losses in the system).

The image on the ground glass face 46 can be viewed by an observer through a focusing lens 52, triangular prism 54 and roof prism 56, arranged as shown in FIG. 5. The lens elements 52, 54 and 56 rectify the image shown on ground glass screen 45 so that it will be upright and without lateral inversion when viewed by said observer.

Referring back to the beam of light reflected from the eye 20 through lens elements 22, 30, 32 and 34 (FIG. 4), this beam leaves prism 34 and enters prism 36, where about one-third of the light is lost and of the balance half of the light of the beam is reflected as a spot of light onto ground glass screen 43, and the other half passes through the diagonal faces of prisms 36 and 38 and is shown as a spot of light on ground glass screen 45. The spot of light on ground glass screen 43 is superimposed on the image focused on that screen by lens 50, so that both are photographed together by camera 14. Similarly, the spot of light on ground glass screen 45 is superimposed on the image focused on the screen by lens 50, and both can be viewed together through the observer's lens 52. The position of the spot of light relative to the image is identical on screens 43 and 45.

When the apparatus is first mounted on the subject's head, the subject is asked to look at a particular point in the scene in front of him with his eye 18 (or both eyes, if the prism 22 and tube 24 are positioned obliquely relative to eye 20), and then the apparatus is adjusted until an observer looking through lens 52 finds the spot of light on ground glass screen 45 shown in the image on said screen at the point where the subject states that he is looking with his eye 18 (or both eyes, if prism 22 and tube 24 are mounted obliquely). The tube 24 may be adjusted up and down for this purpose, and the entire camera and optical system are mounted so that they can be moved as a single unit forward or backwards on a pair of tracks 58, and sidewise in either direction on a pair of tracks 60, in order to facilitate this adjustment. Once the adjustment has been made, so that the spot of light from source 28 is calibrated with the subject's eyes, the subject can look about and the camera 14 will record exactly what he is looking at, and his point of visual concentration, in the scene before him. If desired, an observer can also look through the lens 52 to see the point of concentration of the subject as his eyes look around any scene in front of him. It has been found that the apparatus is accurate when the subject rolls his eyes no more than 15° to either side of, or above or below, his median line of vision, but this limitation is not serious, because it is normal for a subject to move his head rather than move his eyes more than that degree from said median line of vision.

Among possible modifications of the invention are the substitution of a lens focusing system between prism face 42 and the camera lens to replace ground glass screen 43, the use of a reflex camera which would permit an observer to look through the camera lens, and the use of a fiber optical system to provide a flexible optical transmission between the camera (which could be transferred to a fixed amount) and those optical elements which must be mounted on the subject's head.

While present preferred embodiments and methods of practicing the invention have been illustrated and described, it will be understood that the invention may be otherwise variously embodied and practiced within the scope of the following claims.

We claim:
1. Apparatus for determining the point of visual concentration of a subject, comprising a camera, a lens for receiving and focusing light from a scene, a beam-splitting unit interposed between said camera and lens, a telescoping vertical tube, a light source and a reflector mounted at the lower end of the tube, a pentaprism mounted at the upper end of the tube, a triangular prism next to the pentaprism and said beam-splitting unit to transmit light therebetween which has been transmitted from said light source by the cornea of an eye into said reflector and up said tube to said pentaprism, a surface on which a part of said transmitted light and an image focused by the first-mentioned lens are received through said beam-splitting unit, and a roof prism, triangular prism and viewing lens for transmitting said image to an observer.

2. Apparatus according to claim 1, including a headgear, means mounting the specified elements on said headgear, and means to adjust the position of said elements as a unit in generally horizontal directions relative to said headgear.

References Cited by the Examiner
UNITED STATES PATENTS

| | | | |
|---|---|---|---|
| 1,605,725 | 11/1926 | Herbert | 88—20 X |
| 2,288,216 | 6/1942 | Tillyer | 88—20 |
| 2,311,914 | 2/1943 | Tiffin et al. | 88—20 |
| 2,807,198 | 9/1957 | Resnik | 346—108 X |

FOREIGN PATENTS 341,508  6/1904  France.

OTHER REFERENCES

Floyd: On the Line of Sight, Design (a British publication), April 1959, pages 24–31.

JEWELL H. PEDERSEN, *Primary Examiner.*
WILLIAM MISIEK, EMIL G. ANDERSON,
*Examiners.*